Inventor:
Emil Sennhenn
by Michael S. Striker
Attorney

Inventor:
Emil Sennhenn
By Michael S. Striker
Attorney

Inventor:
Emil Sennhenn
By: Michael S. Striker
Attorney

Inventor:
Emil Sennhenn
by Michael S. Striker
Attorney

United States Patent Office 3,198,882

Patented Aug. 3, 1965

3,198,882

METHOD AND SYSTEM FOR AUTOMATICALLY CONTROLLING THE GAIN OF TELEVISION SIGNALS REFERENCE PULSE

Emil Sennhenn, Darmstadt-Arheilgen, Germany, assignor to Fernseh G.m.b.H., Darmstadt, Germany Continuation of application Ser. No. 33,471, June 2, 1960. This application June 7, 1963, Ser. No. 286,418 Claims priority, application Germany, June 9, 1959, F 28,646; Mar. 2, 1960, F 30,660
7 Claims. (Cl. 178—7.1)

This is a continuation-application of my co-pending application Serial No. 33,471, filed June 2, 1960, entitled "Method and System for Automatically Controlling the Gain of Television Signals," now abandoned.

The invention relates to television and more specifically to a method and a system for automatically controlling the gain of television signals. In television technique there often arises the problem of keeping a reference level, for example the white level, constant as the signal amplitude changes. In many cases the alterations of signal amplitude take place very rapidly, within a fraction of a picture period, and it is desired to counteract the effects of this alteration very rapidly and accurately, since the eye is very sensitive to differences in brightness. The control circuits hitherto customary, however, are not capable of meeting such extreme requirements for rapidity of control.

In the control circuit for automatically controlling the gain of television signals according to the present invention the control voltage, preferably derived from a peak value, is applied in the form of impulses to a clamp circuit as control pulses and the alterations of voltage appearing upon a capacitor charged by means of the clamp circuit are employed to control the gain. With such a control circuit it is possible to achieve very short control delays. In the case of a television signal the transition time may be reduced to a few line periods. The alterations in voltage appearing on the capacitor charge by the clamp circuit may be applied in the form of impulses as control impulses to a further clamp circuit connected to the controlled electrode of the controlled amplifier stage. A particularly short control delay may be attained if the polarity of the signals of increasing amplitude and the alterations of control voltage for greater gain are of the same polarity at the controlled stage.

A particularly valuable application of the control circuit according to the invention is in standards converters for the conversion of television signals into other television signals of different picture frequency.

Figure 1:
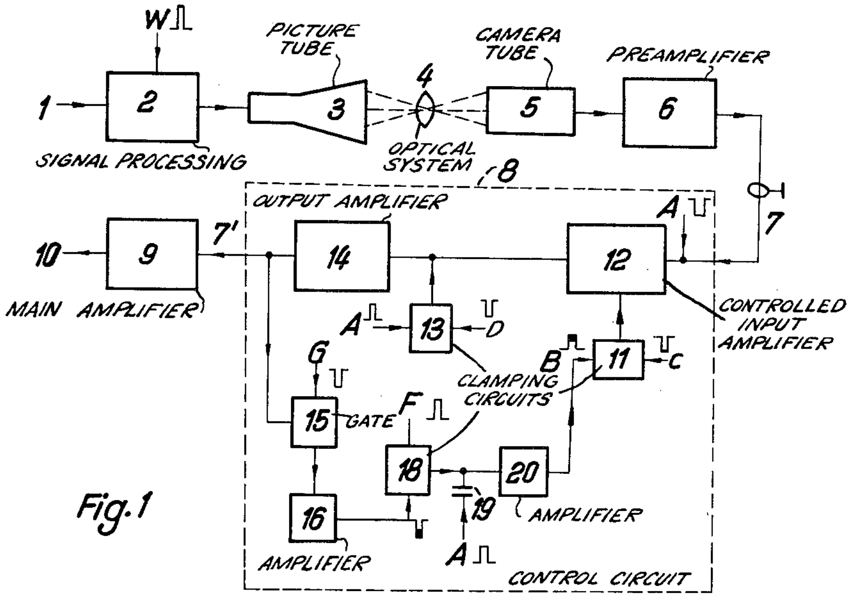
Figure 2:
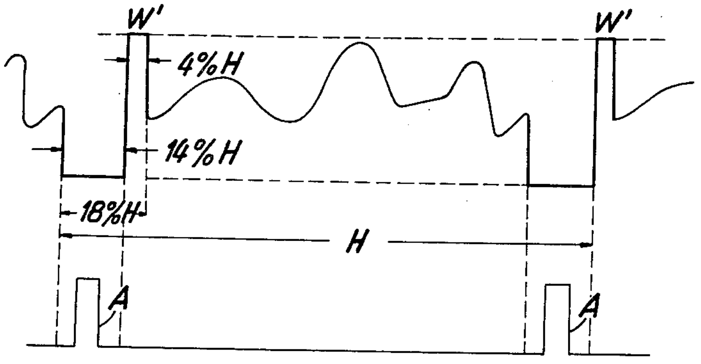
Figure 3:
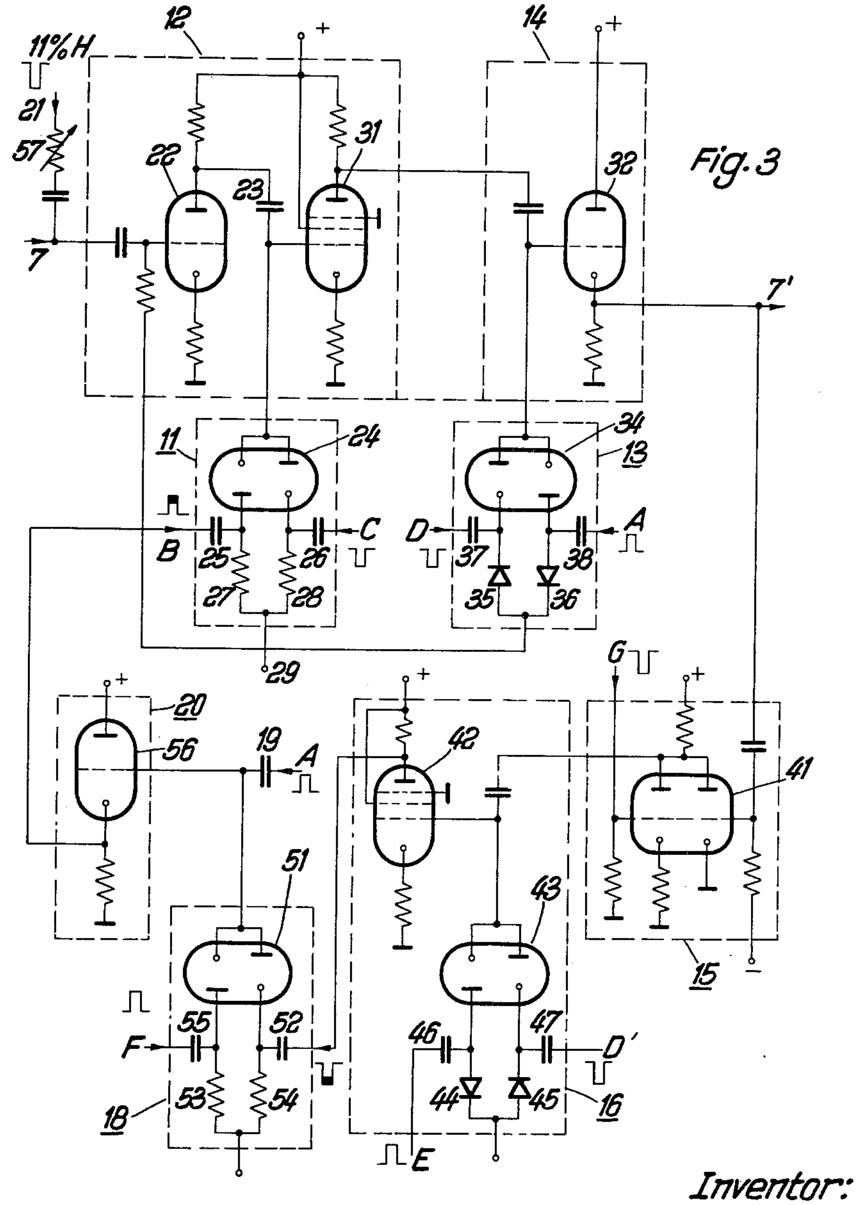

The invention will now be further explained with reference to the accompanying drawings, comprising FIGURES 1 to 10, of which:

FIGURE 1 shows the block circuit diagram of a standards converter including a gain-control circuit according to the present invention, FIGURE 2 comprises waveform diagrams illustrating the timing of pulses used in operating the circuit according to the invention, FIGURE 3 is the circuit diagram of a practical embodiment of the circuit shown schematically in FIGURE 1.

Figure 4:
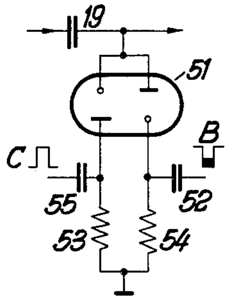
Figures 5, 6:
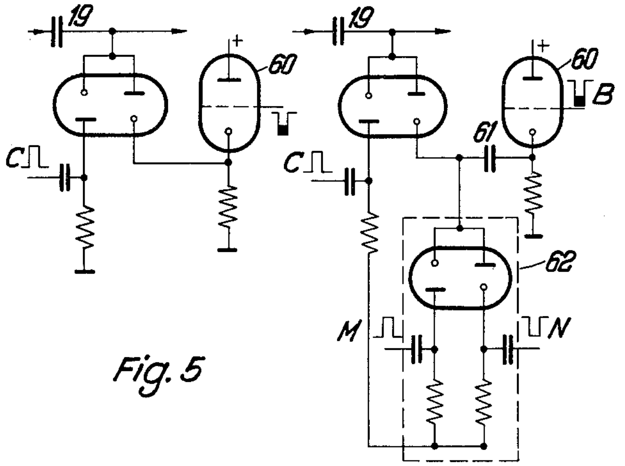
Figures 7, 8:
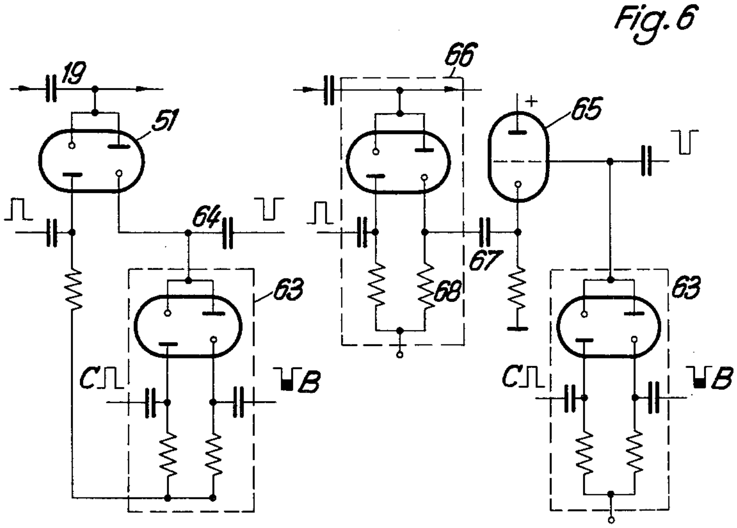
Figure 9:
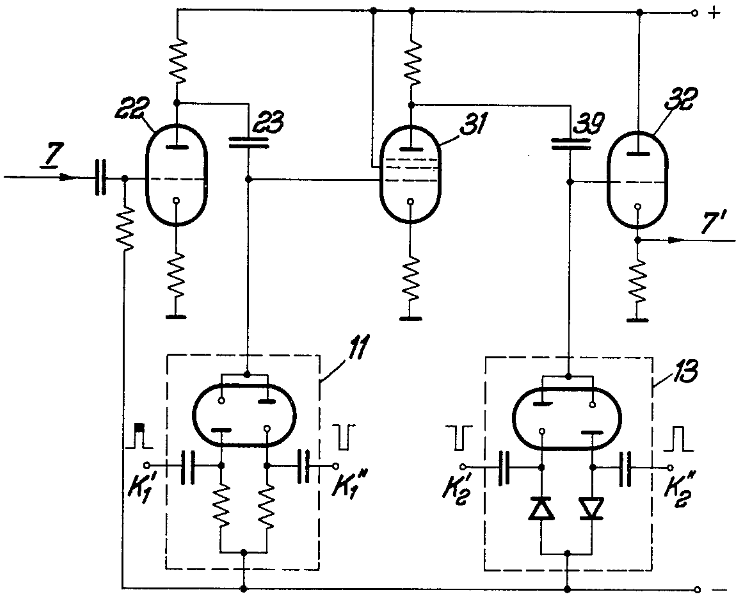
Figure 10:
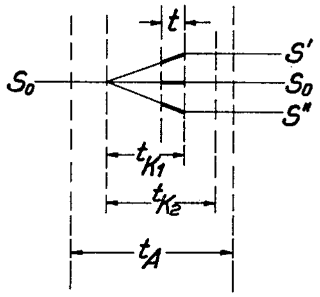

FIGURE 4 shows the control clamp circuit only for a periodically varying control signal, FIGURE 5 shows a control clamp circuit which transmits the direct-current component of the control signal also, FIGURE 6 shows a modification of the circuit according to FIGURE 5, FIGURE 7 shows an embodiment of the control circuit for the case where the control voltage impulses are of different phase from the clamp impulses, FIGURE 8 shows a modification of the circuit according to FIGURE 5, FIGURE 9 shows a controlled amplifier together with a clamp circuit provided subsequent to the controlled stage for correcting the black level of the controlled signals and FIGURE 10 is a schematic diagram showing the control process as a function of time.

In FIGURE 1 the television signal to be converted from one standard to another standard, and which may for example be of the American standard of 525 lines, 60 frames per second, is received at 1 and is applied to to a picture tube 3, on the screen of which there is thus displayed a television picture of the standard to be converted. The block 2 contains the devices necessary for the amplification of the television signal and for the operation of the picture tube 3. By means of an optical system 4, shown for convenience in illustration as a single lens, the television picture thus displayed is projected upon the photo-sensitive layer of a pickup tube 5, which may for example be of the vidicon type. In this pickup tube the image is scanned in accordance with the standard to which the picture is to be converted. Block 6 contains the preamplifier for the television signal developed contains the preamplifier for the television signal developed by the pick-up tube 5 and the devices necessary for the operation of the tube, and may be combined with the pickup tube 5 into a television camera head. The television signal provided by the preamplifier is conventionally applied directly by way of a connection 7, 7′ to a main amplifier 9, from the output 10 of which there may be taken a television signal of the other standard but with the picture content of the signal to be converted.

As long as the number of pictures or frames transmitted in unit time is the same in both standards, as in the conversion of a signal of the British standard of 405 lines, 50 frames per second, into a signal of the European standard of 625 lines, 50 frames per second, a standards converter of the kind above described operates satisfactorily. It is found, however, that when the television signals have different picture or frame frequencies, for example in the conversion of a television signal of the American standard of 525 lines, 60 frames per second, into a television signal of the European standard (625 lines, 50 frames per second) there arise disturbances which make themselves noticeable as periodic fluctuations in brightness of the televsion picture reproduced from the converted television signal. The periodicity of these fluctuations in brightness corresponds to the difference between the vertical frequencies of the two television signals; in the example mentioned the periodicity thus amounts to 10 cycles per second. Fluctuations in brightness at such low frequencies are found to be extraordinarily disturbing to the eye even when the differences in brightness are small. It has therefore not been possible hitherto to employ standards converters of the type described with satisfactory results to convert television signals into others with a different frame frequency. By the use of a control circuit according to the invention it now becomes possible to eliminate the periodic fluctuations in amplitude of the converted television signals so rapidly and accurately that they are no longer disturbing in appearance. For this purpose the television signal passes through the control circuit 8, which can be connected in the signal path between the pre-amplifier 6 and the main amplifier 9.

In order to obtain a reference level to which the control circuit may respond there is added to the picture signal to be converted, for example in the device 2, an impulse W of constant amplitude. The amplitude of this impulse preferably corresponds to the white level. The reference impulse is added at the beginning of each line of the picture signal to be converted and may conveniently have a duration of about 4% of the line period. The timing of the impulses is so chosen that their trailing edges approximately coincide with the trailing edges of the horizontal blanking pulses, which may themselves have a duration of, for example, 18% of the line period, in the television signal to be converted. The sequence of these reference impulses is interrupted during the vertical blanking periods, since the vertical fly-back is not visible in the picture displayed.

In the image reproduced by the picture tube 3, such a train of impulses appears as a vertical white strip outside the left-hand margin of the television picture proper. In order that this white strip shall be visible in the display the mask limiting the picture area should include not only the area of the television picture, with its aspect ratio of 4:3, but also an additional area at its left-hand margin. The pickup tube 5, or the television camera containing it, is now so adjusted that the white impulses W′ appear between the trailing edges of the blanking impulses of the amplifier, with a duration of about 18% of the line period, and the blanking impulses in the camera, with a duration of some 14% of the line period. This timing is shown in FIGURE 2, from which the relation of the various pulses may readily be seen. The reference pulses W′, with a duration of about 4% of the line period H, lie within the blanking intervals of the amplifier, which have a duration of 18% of the line period H, but outside the blanking pulses for the camera, which have a duration of only 14% of the line period H. They are therefore contained in the televsion signal delivered by the pick-up tube.

In the control circuit 8 the television signal is taken through amplifiers 12 and 14, to which the output lead 7′ taking the signal to the main amplifier 9 of the camera chain is connected. The amplifier 12 is the controlled stage of the control amplifier, the gain of which is controlled in accordance with the invention by altering the working point of an amplifier stage by means of a clamp circuit 11. For this purpose the clamp circuit 11 is fed on one side with the control voltage B in the form of impuses and on the other side with a similar series of pulses C of constant amplitude.

The control voltage B is obtained from the television signal appearing at the output of the amplifier 14. To gate 15 there is applied a gating impulse G which has a duration and timing such as to include the reference impulse W′ in the converted television signal. The gating impulse G thus has a duration of about 4% of the line period, while its leading edge approximately coincides with the trailing edge of the 14% blanking pulses. During the vertical blanking intervals the vertical white strip produced by the reference impulses W′ in the picture to be converted is not present. During these vertical blanking periods, therefore, the control arrangement would attempt to increase the gain, because of the missing control voltage, so that distortions would appear in the first few lines of the converted picture. The series of gating pulses G is therefore interrupted by vertical frequency impulses with a duration of some 3% of the frame duration.

The television signal combined with the gating pulses G is now passed into an amplifier stage 16 which is so adjusted that the signal is transmitted only during the presence of the gating pulses G. The amplitude of the control voltage impulses supplied by the stage 16 alters in accordance with the variations of the while level in the converted television signal and the working point of this stage is stabilized by a clamp circuit. By means of a further clamp circuit 18 the control voltage impulses are now used to control a further amplifier stage 20. To the clamp circuit 18 there is in addition applied a similar train of impulses F of constant amplitude. By means of the clamp circuit 18 the condenser 19 is charged in accordance with the fluctuations in the amplitude of the impulses applied to the clamp circuit and serves to maintain the potential produced by the operation of the clamp circuit constant over a line period. In addition there is transmitted through the condenser 19 a clamp impulse falling within the blanking interval, the timing of which more or less corresponds to that of the impulse A in FIGURE 2. Stage 20, which may be a cathode follower, provides the clamp impulse B for the control of the gain of the controlled amplifier 12 by means of the clamp circuit 11.

Owing to the alteration of the working point of the controlled amplier 12 the signal level corresponding to the black level also shifts. In order to bring this level again to a constant potential there is provided a further clamp circuit 13, which is arranged subsequent to the controlled amplifier 12.

When a vidicon is used as the pickup tube 5, there appears owing to the large dark currents a raising of the signal level corresponding to picture black during the blanking periods in the television signal. The consequence of this is that a control signal becomes effective even for picture black, although during the conversion of the signal for picture black no fluctuation in the amplitude of the signal can in fact occur. In order to compensate for the influence of the dark signal a line-frequency impulse of, for example, 11% of the line period, may be introduced at the input of the controlled amplifier. The clamp circuits then operate on the base of the impulses, which is adjusted to picture black. By means of the arrangement described a transition time of only four lines, that is, about 0.25 millisecond can be achieved. For the periodicity of 10 cycles per second of the fluctuations to be equalized which has already been mentioned, this means that the control voltage is shifted in phase by only about 1° with respect to the picture signal.

A particularly short delay period for the control can be achieved by arranging that at the input of the controlled valve in amplifier 12, that is at the clamp circuit 11, the picture signal is of positive polarity, which is the same polarity as the alterations of the control voltage for increased gain. In the opposite case, when the picture signals are of negative polarity, the working point would be shifted towards more positive values for a reduction in gain, that is, when the signal became larger. The subsequent clamp circuit 13 would not, however, be immediately able to bring the altered black level back again to its correct constant potential. The time necessary for this operation amounts to a few line periods. Thus during this interval the picture signal of negative polarity would at first diminish in amplitude and only subsequently could the increased gain take effect.

FIGURE 3 shows the full circuit diagram of the arrangement which is shown in block form in FIGURE 1, electron tubes being used as the active elements. The controlled amplifier 12, connected in the path of the television signals, contains a variable-$\mu$ pentode 31. In front of the controlled tube is a further amplifier stage 22, which may conveniently be formed on one section of a double triode of the commercial type 6922. To the control grid of this tube the television signal is applied with negative polarity and with an amplitude of, for example, 0.1 $v._{pp}$ (peak-to-peak voltage) by way of the connection 7.

The bias on the grid of the amplifier tube 31, which determines the working point and thus the gain of the tube, is produced on the coupling capacitor 23 by means of the clamp circuit 11. The clamp circuit 11 may be formed, for example, by a double diode 24 (commercial type 5726). The control for the clamp circuit is provided by the impulses B of positive polarity and by the impulses C of negative polarity, which are fed to the clamp circuit by way of capacitors 25 and 26 respectively. The impulses C are of constant amplitude, conveniently 5 $v._{pp}$ (peak-to-peak voltage), while the impulses B, which have the same duration and phase, vary in amplitude in accordance with the variations of control voltage. In order that these fluctuations shall be transmitted even at low frequencies, in the present case down to 10 cycles per second, the capacitor 25 must have a sufficiently high capacitance and the resistance 27 a correspondingly high resistance. Thus these components may have values of 1$\mu$f. and 1 megohm respectively. The elements of the corresponding circuit for the second diode, that is, resistor 28 and capacitor 26, on the other hand need only transmit the voltage impulses and may offer a high impedance to the low-frequency variations of control voltage. Capacitor 26 may therefore have a value of 0.002 $\mu$f. and resistor 28 may have a value of 250 kilohms.

In order that the voltage at the grid of the controlled amplifier tube 31 may follow the fluctuations in amplitude of the control voltage impulses B, the energy of these fluctuating control pulses B must be adequately large as compared with the amount of charge on the capacitor 23. In addition to adequate energy in the control pulses themselves it is assumed that the capacitance of the capacitor 23 is small compared with that of the capacitor 25. Capacitor 23 may well have a value of 0.001 $\mu$f.

In order to overcome the displacement of the black level due to the shift of the working point of the controlled amplifier tube 31, the gain-controlled television signal is, as already explained, stabilized by means of a clamp circuit 13 in the subsequent amplifier 14, which includes a tube 32 connected to operate as a cathode-fol lower. This tube may conveniently be constituted by one section of a commercial type 6922 double triode. The clamp circuit 13 may comprise a double diode 34, for example of the commercial type 5726 and two semiconductor diodes 35 and 36, which may be of the commercial 1N38. The control pulses A and D, which may have amplitudes of 5 $v._{pp}$ (peak-to-peak voltage), are applied to the clamp circuit by way of the capacitors 37 and 38, respectively, which may each have a value of 0.02$\mu$f.

The control voltage is derived from the output voltage appearing on the output connection 7' of the cathode-follower 32. For this purpose the output signal is applied to an amplifier stage 15, which comprises a double triode 41, conveniently of the commercial type 6922. The anodes of the two sections of tube 41 are connected in parallel and the output signal is taken from the anode circuit. The grid of the left-hand section of tube 41 receives a gating pulse G, the effect of which is that the subsequent valves become operative only during the scanning of the white control strip in the display. The signal then passes to another stage 16, which contains an amplifier tube 42, conveniently of the commercial type 6227, to the control grid of which is connected a clamp circuit constituted by a double diode 43, conveniently of the commercial type 5726, and two semiconductor diodes 44, 45, conveniently of the commercial type 1N38. To the clamp circuit control pulses D and E of opposite polarity, each conveniently with an amplitude of 9 $v._{pp}$ (peak-to-peak voltage), are applied by way of capacitors 46, 47 respectively. These capacitors may each have a capacitance of 0.025 $\mu$f. The working point of tube 42 is so adjusted that only those white impulses of fluctuating amplitude are transmitted which are raised by the impulses G. The impulses taken from the anode of tube 42 are applied to the clamp circuit 18 as control pulses by way of the capacitor 52, which may have a value of 8 $\mu$f. The clamp circuit comprises a double diode 51, which may be of the commercial type 5726 and the resistances 53, conveniently having a value of 250 kilohms, and 54, which may have a value of 1 megohm. A reference pulse F which has a duration and phase similar to that of the control pulse from tube 42, is applied to the circuit with a constant amplitude by way of a capacitor 55, conveniently having a value of 0.1 $\mu$f.

The tube 56 in amplifier 20 is controlled in accordance with the fluctuations in the amplitude of the control voltage impulses, since the capacitor 19, which may have a value of 0.01 $\mu$f., connected to its control grid is charged by way of the clamp circuit 18. In addition a normal clamp pulse A having an amplitude of 5 $v._{pp}$ (peak-to-peak voltage) and falling within the blanking interval is applied to the grid of amplifier tube 56 by way of the capacitor 19. The control voltage impulses B can now be taken from the cathode of tube 56 and applied to the control clamp circuit 11.

In order to compensate for the effect of the dark current in the pickup tube there is applied to amplifier 12 by way of the lead 21 a line-frequency impulse with a duration of about 11% of the line period H and an amplitude which may be adjusted by means of the variable resistor 57 to a value such that the base of the impulse corresponds to the black level.

The various impulse trains necessary to operate the arrangement described above are generated in an impulse generator which is not shown in the figure. These pulse trains comprise the clamp impulses A and D, with amplitudes of 5 $v._{pp}$ (peak-to-peak voltage) and D' and E with amplitudes of 13 $v._{pp}$ (peak-to-peak voltage), the duration and timing of which correspond to that of the impulse designated A in FIGURE 2. In addition the pulse generator provides the gating pulse G, with a duration of 4% of the line period H, this train of impulses being interrupted by a vertical-frequency impulse of some 3% of the frame period, and a similar impulse F of opposite polarity and constant amplitude. The timing of these impulses corresponds to that of the control impulses W' appearing in the converted signal (see FIGURE 2).

In using the control circuit according to the invention it is in many cases necessary to transmit also the direct-current component of the impulses which form the control voltage. In the example hereabove described this is not necessary, since the control voltage varies periodically at 10 cycles per second. Thus in this case the control voltage can be applied to the control clamp circuit as control impulses by way of an appropriately large capacitor. The corresponding circuit is shown in FIGURE 4. The control voltage B, consisting of pulses of periodically varying amplitude, is applied to the clamp circuit formed by double-diode 51 and resistors 53, 54, by way of a capacitor 52, which may have a value of 1 $\mu$f. and charges the capacitor 19, of for example 0.001 $\mu$f., in accordance with the variations in control voltage. An impulse C of constant amplitude is applied to the clamp circuit by way of capacitor 55.

If, on the other hand, the direct-current component of the impulses forming the control signal must be transmitted, that is, when the brightness fluctuations to be compensated are not known to be periodic, then this may be effected as shown in FIGURE 5, the control voltage impulses being transmitted to the clamp circuit by way of a cathode-follower stage 60, which is coupled directly with the diode in the clamp circuit. In this arrangement care must be taken that the working point of the cathode-follower 60 is so adjusted that the potentials at the two sections of the double diode are approximately the same. Any alteration of the operating conditions of the cathode follower therefore introduces the danger that the potential ratios may be shifted in an unacceptable manner.

The circuit of FIGURE 6 is not subject to this disadvantage. In this arrangement only the alternating components of the control voltage impulses are transmitted from the cathode follower 60 by way of the capacitor 61 to the diode in the clamp circuit, and the direct-current component is restored by means of a further clamp circuit 62. The impulses M and N for controlling the clamp circuit 62 must be of a phase different from those of the control voltage impulses B and the constant-amplitude reference impulses C. In addition the control voltage of the impulses B must be limited in one direction.

FIGURE 7 shows an embodiment of a control circuit according to the invention for the case in which the control voltage impulses B and the reference impulses C are of a phase different from that of the control pulses applied to the clamp circuit for charging the capacitor 19. The control voltage impulses B and the reference impulses C then control a clamp circuit 63 by which there is controlled the voltage on capacitor 64 through which the clamp impulses of differing phase are applied. If the direct-current component is to be transmitted in this case also, then the clamp circuit 63 can be arranged in accordance with FIGURE 5 or FIGURE 6.

FIGURE 8 shows a circuit similar to that of FIGURE 7, from which it differs in the interposition of a cathode-follower stage 65 between the clamp circuits 63 and 66. Such a circuit is necessary when the train of control impulses contain intervals, for example, when it is interrupted by impulses of vertical frequency. The cathode-follower stage 65 may, as shown in FIGURE 8, be coupled capacitively to the clamp circuit 66 by way of a capacitor 67, or may be directly coupled to it. In this latter case the capacitor 67 and the resistor 68 becomes unnecessary.

In the arrangements described with reference to FIGURES 1 and 3 a reference level in the controlled signal, preferably its black level, is held to a constant potential by means of a clamp circuit arranged subsequent to the controlled stage.

It has been found, however, that the potential of the black level in the controlled signal is in many cases not held constant with sufficient accuracy and is subject to fluctuations which increase in amplitude as the signal shift due to the operation of the gain control becomes greater. To avoid this difficulty the clamp circuit connected subsequent to the controlled stage is arranged to continue in operation after the clamp circuit of the controlled stage has ceased to be effective. This is preferably effected by giving the control pulses for the control clamp circuit a duration shorter than that of the clamp pulses for the black-level clamp circuit.

This will now be further explained with reference to FIGURES 9 and 10. The circuit shown in FIGURE 9 receives the television signal by way of the input connection 7, whence it is applied to an amplifier tube 22. From the anode of this tube the signal passes by way of a coupling capacitor 23 to the grid of the controlled valve 31. The bias at the grid of this valve is altered by means of a clamp circuit 11. For this purpose there are applied to the clamp circuit as control pulses the control voltage impulses $K_1'$ and pulses $K_1''$ of the same phase but of opposite polarity and of constant amplitude. The controlled signal now passes from the anode of the controlled valve 31 by way of a further coupling capacitor 39 to the output valve 32, which is connected as a cathode follower and from the cathode of which the gain-controlled and black-level-controlled signal may be taken by way of the connection 7'.

To the grid of the tube 32 there is connected a further clamp circuit 13, which receives impulses $K_2'$ and $K_2''$ and which is required to hold constant the potential at the grid of the tube 32 corresponding to the black level.

When the amplitude of the control voltage impulses $K_1'$ changes, then the potential at the capacitor 23 and at the grid of the controlled tube 31 alters in the same sense. Since the condenser 23, the capacitance of which is so great that no appreciable change in potential occurs in the time between the clamp impulses, is charged by way of the clamp circuit 11, the adjustment to the altered potential takes place gradually within the duration of the impulses $K_1'$ and $K_1''$. This is shown schematically in FIGURE 10. In this figure $t_{K_1}$ represents the duration of the impulses $K_1'$ and $K_1''$ applied to the clamp circuit 11. As long as the amplitude of the control impulses $K_1'$ remains the same, the potential $S_0$ at the grid of the controlled tube 31 also remains unaltered. For large amplitudes of impulse the potential increases during the impulse and reaches the new, larger value S' only at the end of the impulse.

This alteration of the potential corresponding to the black level is now to be equalized by the clamp circuit 13. When the clamp impulses $K_2'$ and $K_2''$ are similar to the clamp impulses employed in the television equipment and are thus of the same timing and duration as the impulses $K_1'$ and $K_1''$, then the alterations of the black level due to the operation of the gain control are not completely compensated. This is to be attributed to the fact that a certain time is necessary to charge the capacitor 39 to the altered potential, and that this potential is therefore not adjusted to the value S' or S'' present at the end of the impulses, but to a smaller value, which corresponds to the mean value, that is, to the potential appearing during the time $t$. To avoid this error, the clamp circuit 13 is now kept operative after the end of the impulses $K_1$, and $K_1''$ until the potential at the grid of tube 32 has become sufficiently close to the alteration of the potential corresponding to the black level. For this purpose the duration $t_{K_2}$ for the clamp circuit 13 may advantageously be increased as compared with the duration $t_{K_1}$ of the clamp impulses for the clamp circuit 11. The longer clamp impulses $K_2'$ and $K_2''$ must also lie wholly within the blanking interval $t_A$.

The generation of the longer clamp impulses $K_2'$ and $K_2''$ can be effected in the usual manner by means of a clamp pulse generator which is triggered by the same pulse edge as the generator for the clamp impulses $K_1'$ and $K_1''$ used in the equipment, so that both sets of clamp impulses commence at the same instant.

What is claimed as new and desired to be secured by Letters Patent is:

1. An automatic gain control system for television apparatus producing television signals, comprising, in combination, amplifier means having an input for receiving a television signal and an output for delivering an amplified television signal, and having capacitive gain control means; means for deriving from selected recurring portions of said amplified television signal a control pulse having an amplitude varying in accordance with variations of a characteristic of said selected portions of said amplified television signal, and having a predetermined polarity; means for providing a reference pulse occurring simultaneously with said control pulse and having a predetermined constant amplitude with a polarity opposite to that of said control pulse; voltage level control circuit means having a first input receiving said control pulse, a second input receiving said reference pulse, and an output, said circuit means being adapted to produce at said output an output signal having an amplitude depending upon the difference between the voltages of said control pulse and said reference pulse, respectively; and means connecting the output of said circuit means to said capacitive gain control means for charging the latter by said output signal of said voltage level control circuit means and for controlling the gain of said amplifier means in accordance with the resulting voltage variations appearing across said capacitive gain control means.

2. An automatic gain control system for television apparatus producing television signals, comprising, in combination, amplifier means having an input for receiving a television signal and an output for delivering an amplified television signal, and having capacitive gain control means; means for deriving from selected recurring portions of said amplified television signal a control pulse having an amplitude varying in accordance with variations of a characteristic of said selected portions of said amplified television signal, and having a predetermined polarity; means for providing a reference pulse having a predetermined constant amplitude and a polarity opposite to that of said control pulse; bidirectional clamping circuit means having a first input receiving said control pulse, a second input receiving said reference pulse, and an output, means whereby said clamping circuit means is adapted to produce at its output an output signal depending upon the relation between predetermined characteristics of said control pulse and said reference pulse, respectively; and means connecting the output of said clamping circuit means to said capacitive gain control means for charging the latter by said output signal of said clamping circuit means and for controlling the gain of said amplifier means in accordance with the resulting voltage variations appearing across said capacitive gain control means.

3. An automatic gain control system for television apparatus producing television signals, comprising, in combination, amplifier means having an input for receiving a television signal and an output for delivering an amplified television signal, and having capacitive gain control means; means for deriving from selected recurring portions of said amplified television signal a control voltage; means for generating periodically recurring control pulses having amplitudes varying in accordance with variations of said control voltage, and having a predetermined polarity; means for providing reference pulses at the same frequency as said control pulses and having a predetermined constant amplitude and a polarity opposite to that of said control pulses; bidirectional clamping circuit means having a first input receiving said control pulses, a second input receiving said reference pulses, and an output, means whereby said clamping circuit means is adapted to produce at its output an output signal depending upon the relation between predetermined characteristics of said control pulses and said reference pulses, respectively; and means connecting the output of said clamping circuit means to said capacitive gain control means for charging the latter by said output signal of said clamping circuit means and for controlling the gain of said amplifier means in accordance with the resulting voltage variations appearing across said capacitive gain control means.

4. An automatic gain control system for television apparatus producing television signals, comprising, in combination, amplifier means having an input for receiving a television signal and an output for delivering an amplified television signal, said amplifier means comprising at least an output amplifier stage and at least a controllable input amplifier stage, and having capacitive gain control means for controlling the gain of said controllable amplifier stage; means for deriving from selected recurring portions of said amplified television signal a control voltage; means for generating periodically recurring control pulses having amplitudes varying in accordance with variations of said control voltage, and having a predetermined polarity; means for providing reference pulses at the same frequency as said control pulses and having a predetermined constant amplitude and a polarity opposite to that of said control pulses; bidirectional clamping circuit means having a first input receiving said control pulses, a second input receiving said reference pulses, and an output, means whereby said clamping circuit means is adapted to produce at its output an output signal depending upon the relation between predetermined characteristics of said control pulses and said reference pulses, respectively; means connecting the output of said clamping circuit means to said capacitive gain control means for charging the latter by said output signal of said clamping circuit means and for controlling the gain of said amplifier means in accordance with the resulting voltage variations appearing across said capacitive gain control means; second means for providing second reference pulses having a predetermined constant amplitude; and second clamping circuit means having input means receiving said second reference pulses and connected at its output with a junction point between said controllable input amplifier stage and said output amplifier stage for bringing a reference level of the output signal of said controlled amplifier stage to a constant value so as to compensate any alteration of the black level potential in said output signal of said controlled amplifier stage that may be caused by variations of its gain under control of said bidirectional clamping circuit means.

5. An automatic gain control system in a standards converter for television signals from a first to a second different vertical frequency, comprising, in combination, amplifier means having an input for receiving a converted television signal and an output for delivering an amplified converted television signal of said second vertical frequency, said amplifier means comprising at least an output amplifier stage and at least a controllable input amplifier stage, and having capacitive gain control means for controlling the gain of said controllable amplifier stage; means for inserting recurring pulses of constant amplitude into the television signal of said first vertical frequency and to be converted; means for deriving from said pulses appearing in said amplified converted television signal a control voltage; means for generating periodically recurring control pulses having amplitudes varying in accordance with variations of said control voltage, and having a predetermined polarity; means for providing reference pulses at the same frequency as said control pulses and having a predetermined constant amplitude and a polarity opposite to that of said control pulses; bidirectional clamping circuit means having a first input receiving said control pulses, a second input receiving said reference pulses, and an output, means whereby said clamping circuit means is adapted to produce at its output an output signal depending upon the relation between predetermined characteristics of said control pulses and said reference pulses, respectively; means connecting the output of said clamping circuit means to said capacitive gain control means for charging the later by said output signal of said clamping circuit means and for controlling the gain of said amplifier means in accordance with the resulting voltage variations appearing across said capacitive gain control means; second means for providing second reference pulses having a predetermined constant amplitude; and second clamping circuit means having input means receiving said second reference pulses and connected at its output with a junction point between said controllable input amplifier stage and said output amplifier stage for bringing a reference level of the output signal of said controlled amplifier stage to a constant value so as to compensate any alteration of the black level potential in said output signal of said controlled amplifier stage that may be caused by variations of its gain under control of said bidirectional clamping circuit means.

6. A method of automatically controlling the gain in a television signal amplifier, comprising the steps of deriving from selected recurring portions of a television signal delivered by the amplifier a control pulse of predetermined polarity and of a variable amplitude depending upon a varying characteristic of said portions of said television signal; providing a reference pulse occurring simultaneously with said control pulse and having a predetermined constant amplitude with a polarity opposite to that of said control pulse; forming the difference between the amplitude of said control pulse and the amplitude of said reference pulse; deriving from said difference a control voltage varying with variations of said amplitude of said control pulse; and using said control voltage for capacitively controlling the gain of the televsion amplifier.

7. A method of automatically controlling the gain in a television signal amplifier, comprising the steps of deriving from selected recurring portions of a television signal delivered by the amplifier a control pulse of predetermined polarity of a variable amplitude depending upon a varying characteristic of said portions of said television signal; providing a reference pulse occurring simultaneously with said control pulse and having a predetermined constant amplitude with a polarity opposite to that of said control pulse; applying said control pulse and said reference pulse to a clamping circuit; deriving from said clamping circuit a control voltage varying with variations of the difference between said amplitude of said control pulse and said amplitude of said reference pulse; and using said control voltage for capacitively controlling the gain of the television amplifier.

No references cited.

DAVID G. REDINBAUGH, *Primary Examiner.*